No. 806,414. PATENTED DEC. 5, 1905.
H. C. KRAUSE.
METAL SEPARATOR FOR ORE CONCENTRATING PLANTS.
APPLICATION FILED DEC. 13, 1902.
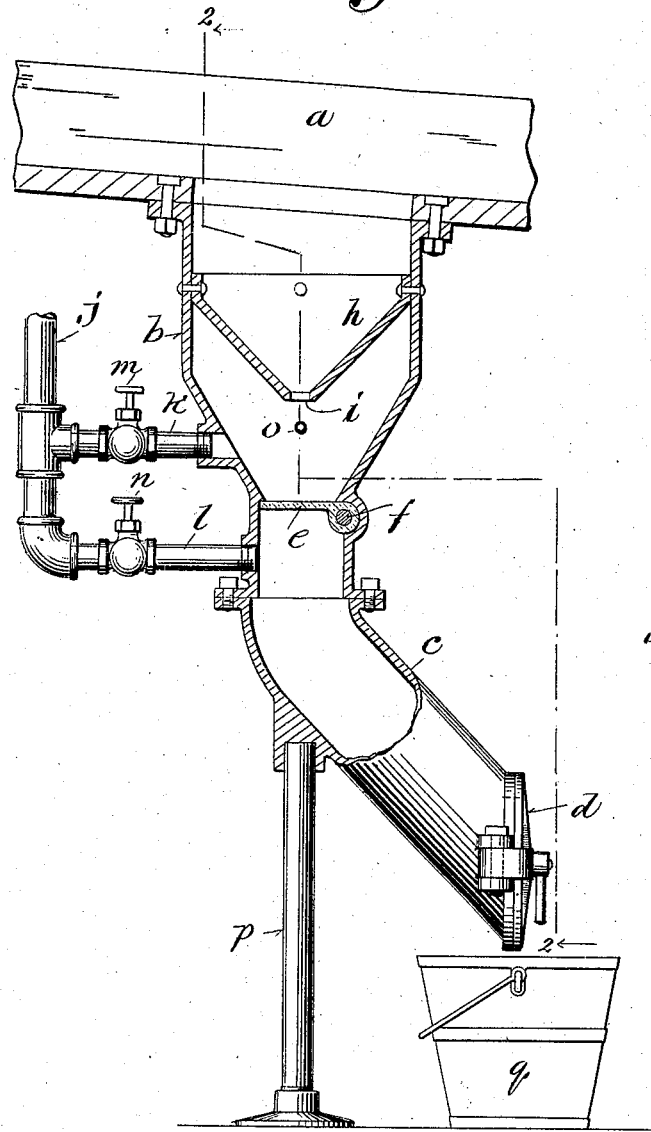
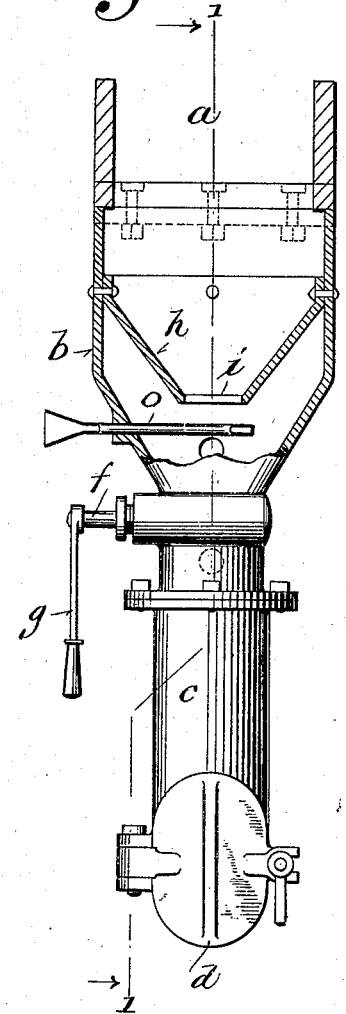
Witnesses
Geo. W. Young.
Chas. L. Goss.
Inventor:
Henry C. Krause,
By Witter, Kenyon, Smith & Butler
Attorneys.

UNITED STATES PATENT OFFICE.

HENRY C. KRAUSE, OF POINT MILLS, MICHIGAN.

METAL-SEPARATOR FOR ORE-CONCENTRATING PLANTS.

No. 806,414.  Specification of Letters Patent.  Patented Dec. 5, 1905.

Application filed December 13, 1902. Serial No. 135,093.

*To all whom it may concern:*

Be it known that I, HENRY C. KRAUSE, a citizen of the United States, residing at Point Mills, in the county of Houghton and State of Michigan, have invented certain new and useful Improvements in Metal-Separators for Ore-Concentrating Plants, of which the following is a specification, reference being had to the accompanying drawings, forming a part thereof.

This invention relates to apparatus of the kind shown in Letters Patent of the United States No. 681,234, bearing date August 27, 1901; and its main object is to separate from the pulp, sand, or gangue of crushed metal-bearing ore free particles or pieces of metal at such point or points in ore-concentrating plants as may be advantageous, and thus economize in the apparatus, labor, and space required for the further treatment of the ore.

It consists, essentially, in certain changes and improvements in and additions to the former apparatus whereby it is adapted for use independently of an ore-crusher and to separate and remove free metal from the pulp, sand, or gangue, as above stated and as hereinafter particularly described, and pointed out in the claims.

In the accompanying drawings like letters designate the same parts in both figures.

Figure 1 is an elevation and a section on the line 1 1, Fig. 2, of a metal-separator embodying my improvements; and Fig. 2 is an elevation and section on the line 2 2, Fig. 1.

The device is in practice attached to and used in connection with a launder, spout, or conduit $a$, in which crushed ore is conveyed with water from one part of an ore-concentrating plant to another. A hopper or hollow body $b$ is attached at the top to the bottom or lower part of said launder, spout, or conduit $a$, in which an opening is made into said hopper. To the lower contracted end of the hopper is attached a discharge conduit and trap or hollow leg $c$, which is preferably inclined laterally and terminates at its lower end in a vertical plane, as shown in Fig. 1. The lower end of the conduit and trap $c$ is provided with a valve or closure $d$, preferably hinged thereto at one side and provided with a fastening at the other. The throat or lower contracted end of the hopper $b$, constituting the upper part of the discharge conduit and trap, is provided with a valve or closure $e$, which may be conveniently fixed on a pivot-stem $f$, passing through a stuffing-box in the hopper and provided at its outer end, as shown in Fig. 2, with an operating lever-arm $g$.

The hopper $b$ is provided between the top and bottom with a funnel-shaped partition $h$, forming with the upper part thereof a receiving-basin and having a contracted discharge opening or orifice $i$ at the bottom. A water-supply pipe $j$ is connected by branches $k$ and $l$, having valves $m$ and $n$, with the hopper $b$, between the partition $h$ and valve $e$, and with the discharge conduit and trap $c$ below said valve $e$. A sounding-tube $o$ passes through one side of the hopper underneath the discharge-opening $i$ and has its inner end closed and its outer end open and flaring, as shown in Fig. 2.

The device, with its contents, may be conveniently supported by a post or column $p$, as shown in Fig. 1.

The discharge-conduit $c$ preferably terminates at its lower end above the floor or ground, so that a bucket $q$ or other portable receptacle may be placed underneath it, as shown in Fig. 1, to receive the metal when discharged from the apparatus.

The device operates as follows: The valve $d$ being closed and the discharge conduit or trap $c$ being filled with water, the valve $e$ is opened and the valve $n$ closed. The valve $m$ is then opened and water is admitted from the supply-pipe $j$ through the branch pipe $k$ into the lower part of the hopper $b$. An upward current of more or less force, depending upon the head or pressure of the water-supply and the degree of opening of the valve $m$, is thus produced through the discharge-opening $i$ into the upper part of the hopper $b$, the water overflowing into the launder or conduit $a$. Free particles or pieces of metal carried with the crushed ore or pulp through the conduit $a$ fall into the hopper and pass through the contracted opening $i$ against the upward current of water into the lower part of the hopper and thence into the discharge conduit or trap $c$. The force of the upward current of water through the hopper is so regulated that while pieces of free metal and heavier pieces of metal-bearing ore are permitted to drop through the opening $i$ the sand, rock, and lighter pieces of ore will be held up and caused to pass along over the hopper to some point beyond for further treatment. The discharge conduit or trap *c* is emptied from time to time into a bucket or other receptacle by opening the valve *d*, the valve *e* being temporarily closed, so that the upward current of water through the hopper and the normal operation of the separator will not be interrupted, the lower part of the hopper *b* below the partition *h* serving temporarily as a receptacle for holding the metal and heavy concentrates falling through the discharge-opening *i* while the trap *c* is being emptied. After said discharge conduit or trap has been emptied it is filled with water by opening the valve *n*, the valve *d* having been closed, so that when the valve *e* is again opened water will not be taken from the hopper *b*, and rock or sand will not be permitted to pass through the discharge-opening *i* by reason of a temporary cessation or diminution of the upward current of water through said opening. By placing an ear to the outer end of the tube *o* the operator or attendant can determine by the sound of the material falling through the discharge-opening *i* against said tube whether the device is operating properly, and he is thus enabled to regulate the supply of water so as to produce the best results.

Various changes in the minor details of construction and arrangement of parts may be made within the spirit and intended scope of the invention.

I claim—

1. In a metal-separator for ore-concentrating plants the combination of a hopper having a funnel-shaped partition which terminates at the bottom in a contracted discharge-opening between the top and bottom of the hopper and forms with the lower part of the hopper a receptacle for metal and heavy concentrates passing through said discharge-opening when the opening at the lower end of the hopper is closed, and a trap connected with the lower part of said hopper and provided at its upper and lower ends with valves, and a water-supply connection leading into said hopper between said partition and the upper valve, substantially as described.

2. In a metal-separator for ore-concentrating plants the combination of a hopper having a funnel-shaped partition which terminates in a contracted discharge-opening between the top and bottom of the hopper and forms with the lower part of the hopper a receptacle for metal and heavy concentrates passing through said discharge-opening when the opening at the lower end of the hopper is closed, a trap connected with the lower part of said hopper and provided at its upper and lower ends with valves, a water-supply connection leading into said hopper between said partition and the upper valve, and a water-supply connection leading into said trap and provided with a valve, substantially as described.

3. In a metal-separator for ore-concentrating plants the combination of a receiving-basin having an orifice through its bottom, a launder or ore-conduit passing across and opening at the bottom into the upper part of said basin, a hollow leg connected with the lower part of said basin, means for closing said leg, a valve for closing communication between said leg and basin, and a water-supply pipe leading into the separator between said basin and said valve, substantially as described.

4. In a metal-separator for ore-concentrating plants the combination of a receiving-basin having an orifice through its bottom, a launder or ore-conduit passing across and opening into the upper part of said basin, a hollow leg connected with the lower part of said basin, means for closing said leg, a valve for closing communication between said leg and basin, and a water-supply connection leading into the separator below said basin, substantially as described.

5. In a metal-separator for ore-concentrating plants, the combination of a hopper having a partition with a contracted discharge-opening between the top and bottom of the hopper, a launder or ore-conduit passing across and opening at the bottom into the upper part of said hopper, a water-supply connection leading into the hopper below said partition, means for regulating the supply of water through said connection, a discharge-conduit connected with the lower part of said hopper and provided with a valve, and a sounding-tube projecting into said hopper below said discharge-opening, substantially as described.

6. In a metal-separator for ore-concentrating plants, the combination of a hopper having a partition with a contracted discharge-opening between the top and bottom of the hopper, a launder or ore-conduit passing across and opening at the bottom into the upper part of said hopper, a water-supply connection communicating with said hopper below said partition, means for regulating the flow of water through said connection, a discharge-conduit connected with the lower part of said hopper and provided with a valve, and a sounding-tube passing through the wall of said hopper below said discharge-opening and having an open flaring outer end and a closed inner end, substantially as described.

7. In a separator of the class described, a receiving-basin having an orifice through its bottom, a hollow leg mounted beneath said basin, means for closing said leg, a valve for closing communication between said leg and basin, and a water-supply pipe between said basin and said valve, for the purpose set forth.

8. In a separator of the class described, the combination with a hollow body, of a perforated partition in the upper end thereof, forming a separating-basin, a hollow leg communicating with the lower end of said hollow body, means for opening and closing said hollow leg, a valve arranged between the hollow leg and the hollow body, a water-supply pipe leading into said hollow body between the valve and the separating-basin, and a water-supply pipe leading into the hollow leg beneath said valve.

In witness whereof I hereto affix my signature in presence of two witnesses.

HENRY C. KRAUSE.

Witnesses:
THOMAS H. LANG,
CHARLES H. KRAUSE.